Sept. 21, 1954 O. DOEHLER 2,689,887

AUTOMATIC GAIN CONTROL FOR A TRAVELING WAVE TUBE CIRCUIT

Filed May 18, 1949 2 Sheets-Sheet 1

INVENTOR:
OSKAR DOEHLER
By: Haseltine, Lake & Co.
AGENTS

AUTOMATIC GAIN CONTROL FOR A TRAVELING WAVE TUBE CIRCUIT

Filed May 18, 1949

2 Sheets-Sheet 2

INVENTOR:
OSKAR DOEHLER
By:
Haseltine, Lake & Co.
AGENTS

Patented Sept. 21, 1954

2,689,887

UNITED STATES PATENT OFFICE 2,689,887

AUTOMATIC GAIN CONTROL FOR A TRAVELING WAVE TUBE CIRCUIT

Oskar Doehler, Paris, France, assignor to Compagnie Generale de Telegraphie Sans Fil, a corporation of France Application May 18, 1949, Serial No. 94,019

Claims priority, application France June 1, 1948

6 Claims. (Cl. 179—171)

This invention relates to a method for automatically controlling the gain in a travelling wave tube circuit, said method enabling a substantially constant output power to be obtained in such a tube despite the considerable variations of the input power.

It is known that a travelling wave tube comprises an input portion including an electron gun that produces an electron beam directed along the axis of a delay line such as a helix at one end of which the gun is placed while the beam is collected at the output portion of the tube by a collector located beyond the other end of the helix. The helix acts as a delay line for a wave to be amplified passing through the helix between the input and the output portions of the tube coupled to said line. A D. C. voltage is supplied both to the helix and to the collector, and since it is possible for the helix to be separated from the collector, the voltages supplied to these two elements may be of different values.

Figure 1:
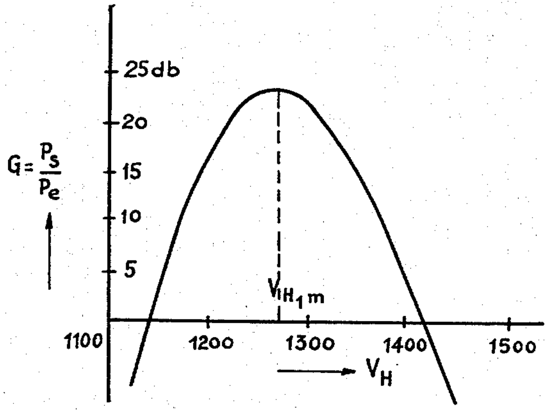
Figs. 1 to 3 show the curves necessary for understanding the invention.

Applicant has found that it is possible to construct a curve as shown in Fig. 1 which shows the variations of the gain G in db of such a tube, i. e. of the ratio between the output power $P_s$ and the input power $P_e$, as a function of the D. C. voltage of the helix $V_H$ and for a constant value of the voltage of the collector. It can be seen that the gain becomes maximum of $$V_H = V_{H_1m} = 1270\ V (G = 23\ \text{db})$$

and decreases on both sides of this value $V_{H_1m}$, falling to 0 db for $V_H = 1145$ V and 1420 V respectively.

Figure 2:
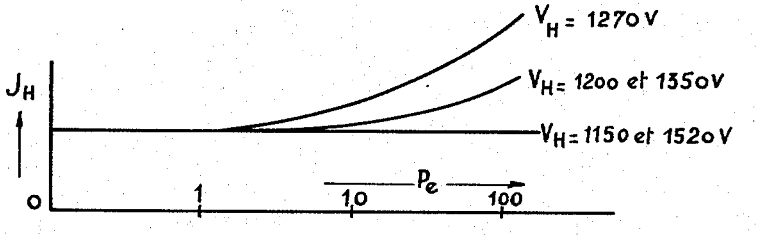
Figure 3:
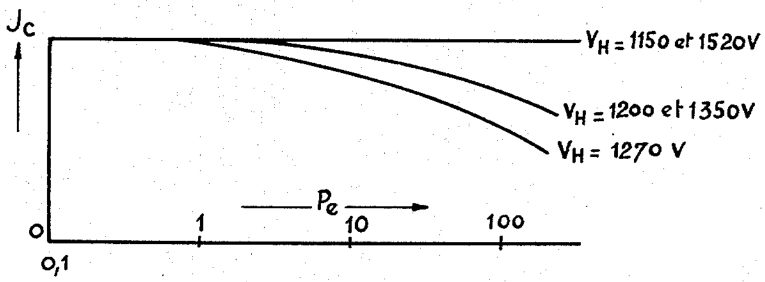

Fig. 2 shows, for different values of $V_H$, the variations of the electronic current $I_H$ collected by the helix as a function of the input power $P_e$, said input power being marked in arbitrary units. For $V_H$=constant, $I_H$ increases with the input power, this increase being at first very small, but becoming greater for higher input power values. Fig. 3 shows the corresponding variations, under the same conditions, of the current $I_c$ in the collector, the direction of the curve of which is the opposite to that of the current in the helix. If the accelerating voltage of the electrons in the electron gun is constant, as will occur if the helix is not connected to the anode of the gun, which is normally the case in practice, the sum of the current in the helix and the current in the collector is constant and does not depend on the voltage $V_H$ or on the input power.

These variations of the current in the helix and the collector with the input power are understandable from the physical standpoint, since alternating radial electric fields produced by the wave exist inside the helix. Owing to these radial fields, radial forces are exerted on the electrons, said forces increasing with the power of the wave and, consequently, with the input power and being proportional to $V_H$. Consequently the currents $I_H$ and $I_c$ vary according to Figs. 2 and 3.

Figure 4:
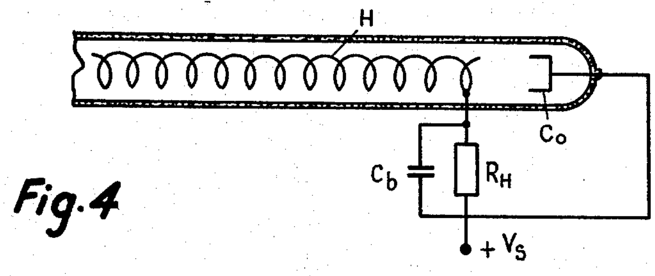
Figs. 4 to 6 show three embodiments of the method described.

According to the invention, these variations of current in the helix are used for automatically controlling the gain. For this purpose, in the embodiment of Fig. 4, the D. C. voltage is not directly supplied to the helix, but is supplied through a resistor $R_H$ which is connected between the helix and the source of D. C. voltage $V_s$ for supplying the collector $C_0$. The values of $V_s$ and $R_H$ are so chosen that for very low values of high-frequency power, the voltage $$V_H = V_s - I_H R_H = V_{H_1m}$$

is obtained on the helix, corresponding to the maximum gain according to Fig. 1. If $I_H$ increases proportionally to the increase in the input power, $V_H$ decreases and consequently according to Fig. 1 the gain G also decreases. By choosing suitable values of $R_H$ and $V_s$, it is possible to make the gain decrease approximately in inverse ratio to the input power, i. e. the output power remains, between certain limits, almost independent of the input power. In order not to eliminate the modulation of the signal to be amplified, the resistor $R_H$ must be shunted by a capacitor $C_b$ so as to obtain a suitable time constant which should be very much larger than a modulation period.

Figure 5:
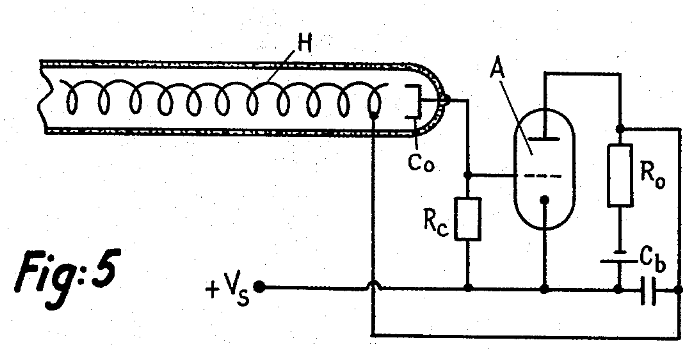

In practice, the values of $R_H$ and $V_s$ depend on the characteristics of the tubes used. In certain cases, in order to obtain a sufficiently constant output power, the values of $R_H$ and $V_s$ have to be very high, which involves all the drawbacks that ensue from the use of high tension and a considerable dissipation of D. C. power in $R_H$. In this case, the automatic control of the gain in order to obtain an aproximately constant output power can be more readily obtained with the device of Fig. 5. In this circuit, use is made of the variations of the current $I_c$ in the collector, which decreases with the increase in the input power according to Fig. 3 and which produces a variation of the voltage drop along the resistor $R_c$ connected in the circuit of the collector. The voltage drop $I_cR_c$ is amplified by a direct current amplifier A with a time constant which is considerably greater than a period of modulation. The amplified voltage across the terminals of the resistors $R_0$, shunted by capacitor $C_b$ so as to obtain a suitable time constant, is placed in series with the supply voltage $V_s$ and supplied to the helix. The phase with which this amplified control voltage is supplied to the helix does not matter, since it can be seen in Fig. 1 that the gain decreases both in the case of an increase and a decrease of $V_H$ with respect to $V_{H_1m}$.

Figure 6:
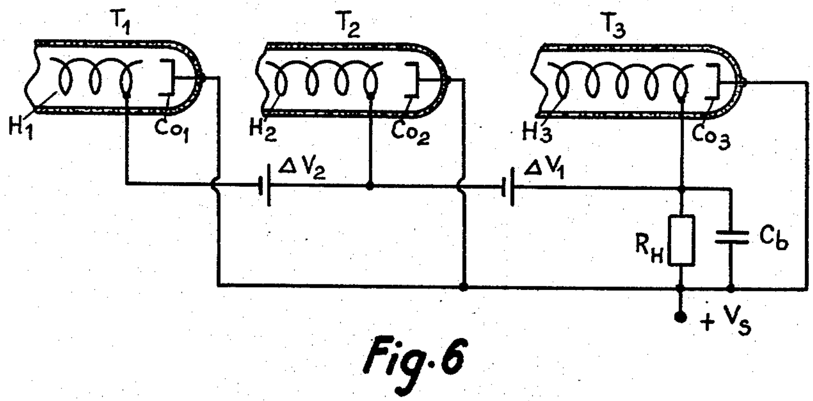

The principle of the invention is in no way restricted to an amplifier circuit provided with one travelling wave tube, but can also be applied, with even still greater advantage, to a multi-stage amplifier. Fig. 6 shows schematically and by way of example a three-stage amplifier provided with travelling wave tubes of the helix type, $H_1$, $H_2$, $H_3$ are the helices of the tubes $T_1$, $T_2$, $T_3$. $+V_s$ is the positive pole of the source of direct current voltage to which the collectors $CO_1$, $CO_2$, $CO_3$ are connected.

The greatest variations of the current $I_H$ occur in the last tube $T_3$, the variations of current $I_H$ in the previous tubes $T_1$ and $T_2$ being normally negligible as compared to those of the tube $T_3$, since the energy that passes through these tubes is small. By applying the control system of Fig. 4 to the tube $T_3$, it is possible to use the voltage drop obtained across the terminals of $R_H$, not only for controlling the gain of the last tube, but also by applying it to the pre-amplifying tubes $T_1$ and $T_2$ as shown in Fig. 6. In order to enable the voltage on each helix $V_H$ to be adjusted to a value that corresponds to the optimum gain for weak signals, which value may be different for different tubes, auxiliary sources of D. C. voltage $\Delta V_1$, $\Delta V_2$, etc. may be connected between the helix $H_3$ and the helices $H_1$, $H_2$. In order to retain the modulation, the resistor $R_H$ is again shunted by a capacitor $C_b$ which introduces a suitable time constant. One advantage of this action on several stages is that the control of the gain of a tube by means of a control voltage produced by the variations of current in a tube located after the gain-controlled tube provides an output voltage which is much more independent of the input voltage than in the case in which a tube is controlled by means of its own current.

This invention is not restricted to the examples described and illustrated which only indicate non-limitative practical means for carrying it out, said means being capable of being subjected to modifications within the reach of one skilled in the art. For example, the amplification of the control voltage in the circuit of Fig. 5 could be obtained with any single-stage or multi-stage D. C. amplifier.

What I claim is:

1. Automatic gain control for an amplifier circuit including at least one travelling wave tube, each travelling wave tube of the circuit comprising a first element defining a delay line, means for producing an electron beam in coupled relationship with the line to cause interaction of the beam with a wave travelling along said delay line, and a second element defining a collector for the electron beam, said automatic gain control comprising, for at least one tube of the circuit, means for separately biasing said elements defining the electron beam collector and the delay line, and means coupled between said elements and responsive to current variations in one of said elements for causing variations of the voltage in the delay line, thereby to control the gain of the amplifier circuit.

2. Automatic gain control for an amplifier circuit including a single travelling wave tube, said travelling wave tube comprising a first element defining a delay line, means for producing an electron beam in coupled relationship with the line to cause interaction of the beam with a wave travelling along said delay line, and a second element defining a collector for said electron beam, said automatic gain control comprising means for separately biasing said elements defining the electron beam collector and the delay line of the tube, and means coupled between said elements and responsive to current variations in one of said elements for causing variations of the voltage in the delay line, thereby to control the gain of the amplifier circuit.

3. Automatic gain control for an amplifier circuit including a plurality of travelling wave tubes, each travelling wave tube of the circuit comprising a first element defining a delay line, means for producing an electron beam in coupled relationship with the line to cause interaction of the beam with a wave travelling along said delay line, and a second element defining a collector for the electron beam, said automatic gain control comprising means for separately biasing said elements defining the electron beam collectors and the delay lines of the tubes, and means coupled between said elements of one of the tubes and responsive to current variations in one of said elements of said one tube, for causing variations of the voltage in the delay line of another tube of the circuit, thereby to control the gain of the amplifier circuit.

4. Automatic gain control for an amplifier circuit including a travelling wave tube having a delay line and an electron beam collector, said automatic gain control comprising, for a travelling wave tube of the circuit, means for separately biasing the collector and the delay line, and means coupled between said collector and delay line and responsive to current variations in the delay line for causing variations of voltage in said delay line, the last mentioned means comprising a resistance inserted between said delay line and the biasing means thereof to maintain the bias at a predetermined constant value so as to obtain the maximum gain of the travelling wave tube.

5. Automatic gain control for an amplifier circuit including at least one travelling wave tube having a delay line and an electron beam collector, said automatic gain control comprising, for one tube of the circuit, means for separately biasing the collector and the delay line of the tube, and means coupled between said collector and delay line and responsive to current variations in the collector of said tube for causing variations in the voltage of the delay line, the last mentioned means comprising a resistance inserted between said collector and the biasing means thereof, and means for superimposing upon the biasing voltage of said delay line a voltage proportional to the voltage at the terminals of said resistance to maintain the bias at a predetermined constant value so as to obtain the maximum gain of the tube.

6. Automatic gain control in accordance with claim 5; further comprising an auxiliary amplifier circuit having an odd number of tubes, means for applying to the input of said auxiliary amplifier the voltage extant across the terminals of said auxiliary amplifier between said delay line and the biasing means thereof.

References Cited in the file of this patent

UNITED STATES PATENTS

| Number | Name | Date |
|---|---|---|
| 2,107,410 | Dreyer | Feb. 8, 1938 |
| 2,139,438 | Brett | Dec. 6, 1938 |
| 2,300,052 | Lindenblad | Oct. 27, 1942 |
| 2,541,843 | Tiley | Feb. 13, 1951 |

| Number | Name | Date |
|---|---|---|
| 2,578,434 | Lindenblad | Dec. 11, 1951 |
| 2,602,148 | Pierce | July 1, 1952 |
| 2,623,193 | Brück | Dec. 23, 1952 |

OTHER REFERENCES

Publication, Proceedings of the I. R. E., Feb. 1947, Traveling-Wave Tubes, pp. 108–123.

RCA Publication, Dec. 1947, vol. VIII, No. 4, "Small-Signal Analysis of Traveling-Wave Tube," by Shulman and Heogy (pp. 585 to 611).